United States Patent [19]

Elankovan

[11] Patent Number: 5,525,365
[45] Date of Patent: Jun. 11, 1996

[54] METHOD FOR PROCESSING FOOD

[75] Inventor: Ponnampalam Elankovan, Okemos, Mich.

[73] Assignees: Gray & Company, Forest Grove, Oreg.; Michigan Biotechnology Institute, Lansing, Mich.

[21] Appl. No.: 362,762

[22] Filed: Dec. 22, 1994

[51] Int. Cl.$^6$ ............................. A23L 1/00; A23B 7/00
[52] U.S. Cl. ..................... 426/239; 426/253; 426/269; 426/639
[58] Field of Search ..................... 426/239, 250, 426/269, 540, 63, 253, 259

[56] References Cited

U.S. PATENT DOCUMENTS

| | | | |
|---|---|---|---|
| H1014 | 1/1992 | Kraut et al. | 426/250 |
| 3,676,335 | 7/1972 | Lacey et al. | 210/641 |
| 3,718,559 | 2/1973 | Wallace | 204/182.5 |
| 3,847,788 | 11/1974 | Wallace | 204/182.5 |
| 4,110,175 | 8/1978 | Ahlgren et al. | 204/182.5 |
| 4,115,595 | 9/1978 | Jordan | 426/250 |
| 4,156,023 | 5/1979 | Jessen et al. | 426/250 |
| 4,514,427 | 4/1985 | Mitchell et al. | 426/271 |
| 4,522,836 | 6/1985 | Dechow et al. | 426/271 |
| 4,713,252 | 12/1987 | Ismail | 426/639 |
| 4,802,965 | 2/1989 | Puetter et al. | 204/182.4 |
| 4,857,343 | 8/1989 | Hekal | 426/239 |
| 4,880,647 | 11/1989 | Hatzidimitriu et al. | 426/239 |
| 4,936,962 | 6/1990 | Hatzidimitriu | 204/182.3 |
| 4,938,856 | 7/1990 | Hatzidimitriu | 204/182.3 |
| 5,019,405 | 5/1991 | Sapers | 426/250 |
| 5,034,105 | 7/1991 | Berglund et al. | 204/182.4 |
| 5,051,236 | 9/1991 | Michaels | 426/495 |
| 5,132,136 | 7/1992 | Sato et al. | 426/493 |

*Primary Examiner*—George Yeung
*Attorney, Agent, or Firm*—Warner Norcross & Judd

[57] ABSTRACT

A method for processing food, and particularly fruit, wherein the leaching discharge stream is separated, for example by desalting electrodialysis, into reusable brine and residual solutions. First, the fruit is brined using conventional techniques. The fruit is then leached or flushed with water to reduce the concentration of brine materials. The discharge stream from the leaching process is separated into a sugar solution and a brine solution, preferably through desalting electrodialysis. The dilute sugar solution is returned to the leaching process to return the natural sugar and color to the fruit. The brine solution preferably is returned to the brining process.

17 Claims, 1 Drawing Sheet

METHOD FOR PROCESSING FOOD

BACKGROUND OF THE INVENTION

The present invention relates to a method for processing food, and more particularly to such a method wherein the feed is brined and then flushed to reduce the level of the brining material.

A wide variety of methods for processing feed are well known in the industry. One such method, used largely in processing fruit and vegetables and particularly appropriate to the production of maraschino cherries, is known as "leaching." This process preserves the fruit and provides it with a desired color and sugar level. The fruit is first soaked in a brine solution containing sulphur dioxide ($SO_2$). The brine solution acts as both a preservative and a bleaching agent. Following brining, the fruit has a relatively high $SO_2$ content and is yellow in color. Next, the fruit is pitted, sized, and sorted. The fruit is then leached or flushed with water to drive the $SO_2$ content down to acceptable levels. The discharge from the leaching process must be treated to meet the applicable effluent standards. The fruit is then moved to a finishing tank where the fruit is given the desired color and sugar content by cycling corn syrup and feed color through the finishing tank.

The described process has several shortcomings. First, the leaching process requires large volumes of fresh water. Second, leaching undesirably removes the natural sugar in the fruit as well as the brining material. This natural sugar must be replaced during the finishing step. Third, treatment of the discharge water is extremely expensive, primarily as a result of the sugars leached from the fruit. And finally, the finishing step, which is undesirably time consuming due to the slow rate at which the fruit will accept the sugar, is lengthened by the need to restore the natural sugar lost during leaching.

SUMMARY OF THE INVENTION

The aforementioned problems are overcome by the present invention wherein the discharge from the leaching process is separated into a brine solution that can be returned to the brining process and a residual sugar solution that can be returned to the leaching process so that the natural sugar in the fruit is retained.

The present method includes the known steps of brining and leaching. However, instead of disposal, the discharge from the leaching process is treated, for example by desalting electrodialysis (DED), to separate the salts, including sulphur dioxide, from the remainder of the stream. The salts, primarily the $SO_2$ or other brining material, are returned to the brining tank; and the remainder of the stream, including the natural sugar and fruit color, is returned to the leaching tank. Accordingly, both the brine and the natural sugar are recovered and reused rather than being discarded. Following leaching, the fruit is finished as is known in the art.

The present method eliminates the costly step of treating the stream that would otherwise be discharged from the leaching process to meet the applicable environmental standards. The method also recovers the natural sugar and color removed from the fruit during leaching and returns it to the fruit. Consequently, the amount of time and sugar necessary to the finishing process are dramatically decreased. In addition, the brining materials are recovered and returned to the brining tank or other brining process, further reducing the quantity of raw materials necessary to process the cherries.

These and other objects, advantages, and features of the present invention will be more fully understood and appreciated by reference to the detailed description of the preferred embodiment and the drawing.

DETAILED DESCRIPTION OF THE PREFERRED EMBODIMENT

Figure 1:
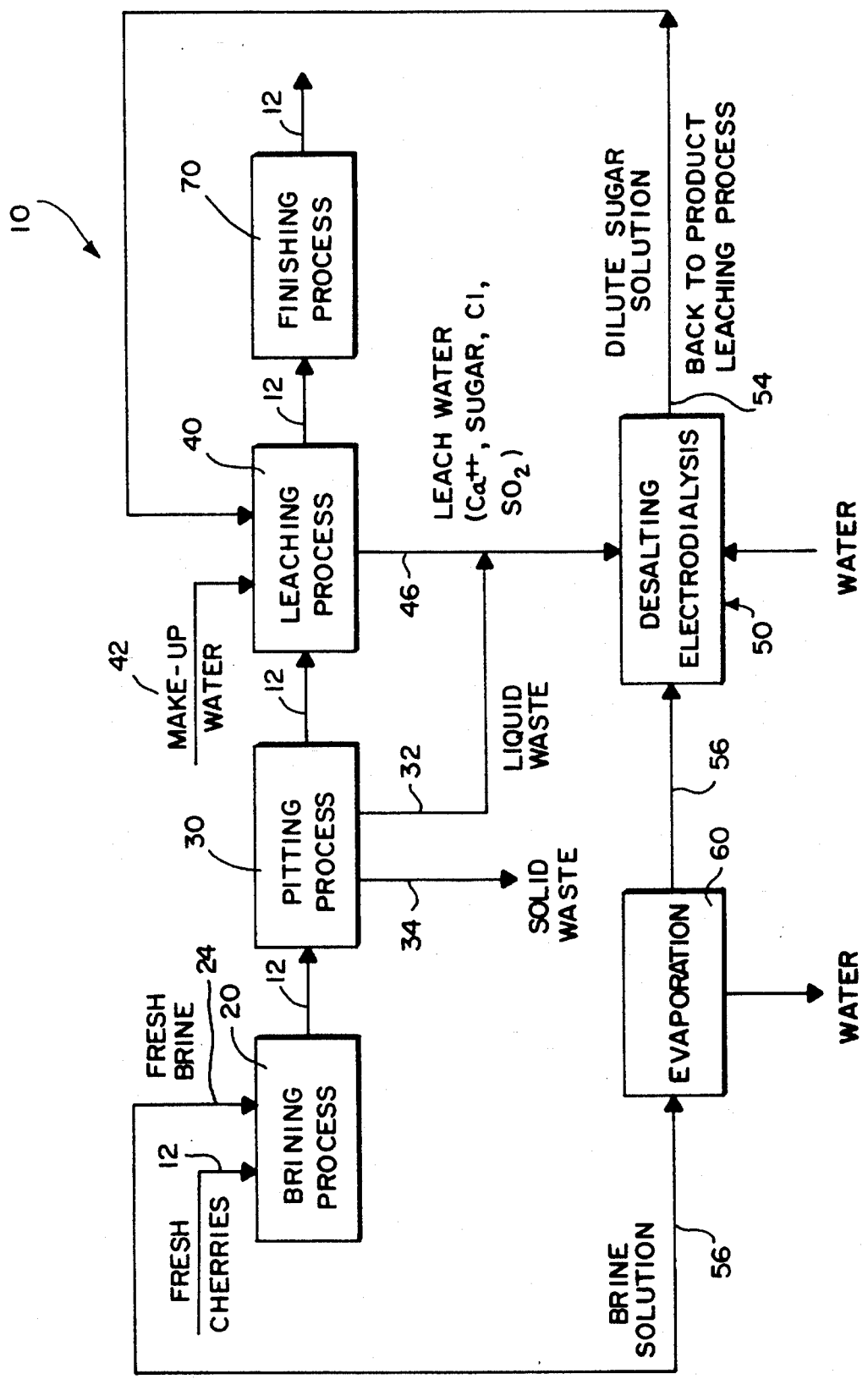
FIG. 1 is a schematic diagram showing the steps of the present method.

The present method is shown in the block diagram of FIG. 1 and generally designated 10. By way of disclosure, and not by way of limitation, the present invention will be described in connection with the processing of maraschino cherries.

The first step in the present; method is to brine 20 the cherries 12. The brining process 20 generally includes placing a desired quantity of fresh cherries 22 into a brining tank and subjecting them to a strong saline solution 24 containing sulphur dioxide ($SO_2$). The brine solution 24 acts as a preservative and a bleaching agent. A preferred brine solution is approximately 1.5% sulphur dioxide. Following the brining process 20, the cherries 12 have an increased $SO_2$ content and are yellow in color. The brining process as well as the necessary related supplies and equipment are well known to those of ordinary skill in the art.

Once the brining process 20 is complete, the cherries 12 preferably go through a pitting process 30 where the cherries 12 are pitted, sized and sorted. While this step is optional, it provides the highest quality finished product. The pitting process 30 results in both liquid and solid wastes 32 and 34 respectively. The solid waste 34 is disposed of in a conventional manner. However, the liquid waste 32 from the pitting process 20 may be treated in a desalting electrodialysis (DED) process 50 which will be described in greater detail below. The pitting, sizing and sorting steps incorporate conventional equipment and techniques.

Next, the cherries 12 are leached 40. Leaching may occur in a separate leaching tank or in the same tank used for brining. Although leaching is generally well known to those of ordinary skill in the art, the leaching discharge recovery/recycling techniques are not. The leaching process 40 generally involves flushing the cherries 12 with large volumes of water 42 to bring the $SO_2$ content down to the desired level. As the water removes the sulfur dioxide from the fruit, the natural sugar and color are also flushed away. This process results in discharge 46 that contains both $SO_2$ and the natural sugar and color of the cherries 12.

However, the present invention reverses the conventional wisdom of (a) throwing away the natural sugar, (b) throwing away the brining material, and (c) spending the time and resources to treat both in accordance with environmental laws and regulations. Instead, the discharge 46 is treated by a desalting electrodialysis (DED) process 50, which removes the salts such as sulfur dioxide to produce a dilute sugar solution 54 and a dilute brine solution 56. The sugar solution contains the natural sugar and color that are flushed from the cherries 12. The dilute sugar solution 54 is reintroduced to the leaching tank with make-up fresh water 42. This returns the vast majority of the natural sugar and color to the cherries 12.

DED is a conventional separation process that employs an electrodialysis stack and an electrical driving force to transfer ions (i.e. salts) from a first solution through a membrane into a second solution. The discharge 46 from the leaching process 40 is circulated through the feed compartment of the DED stack. When an electrical potential is applied to the DED stack, the salts contained in the discharge 46 are transferred from the feed compartment to a concentrate compartment. Consequently, the residual solution contained in the feed compartment is depleted of salts and becomes a dilute sugar solution 54, while the solution contained in the concentrate compartment (dilute brine solution 56) increases in salt concentration. The residual or dilute sugar solution 54 is passed back into the leaching tank where the natural sugar and color flushed out in the discharge 46 are returned to the cherries 12.

Although DED presently is the preferred separation technique, it is within the scope of this invention to use other equivalent techniques. Any process capable of separating the brining material and natural sugar into separate streams would be a suitable alternative.

The dilute brine solution 56 may either be transferred directly back to the brining tank for use in the brining process 20 or it may be used in other brining applications, such as storage tanks. Optionally, it may be concentrated through an evaporation or other process 60. A variety of methods for evaporating water from the dilute brine solution 56 will be known to those of ordinary skill in the art.

Using the recovery techniques of the present invention, the sugar content of the leached fruit is 18%—its natural sugar level. This is in stark contrast to the prior art, wherein the sugar content of the leached fruit is essentially 0%. The increased sugar content has two significant benefits. First, it is natural sugar. Second, finishing time is reduced because the sugar level need only be raised from 18% to 40% rather 0% to 40%.

After leaching, the cherries 12 are finished 70. Finishing may occur in the same tank as leaching and/or brining or the fruit may be moved to a finishing tank. The finishing process 70 gives the cherries 12 the desired color and sugar content. As noted above, the cherries 12 exit the leaching process 40 with a sugar content of approximately 18%; and the preferred sugar content of the finished cherries 12 is approximately 40%. Consequently, corn syrup and food color are cycled through the finishing tank where they are absorbed by the cherries 12 to give the appropriate color and sugar concentration.

While the present method has been disclosed in conjunction with the processing of fruit and in particular with the processing of maraschino cherries, it is not limited to such, and one of ordinary skill will recognize the extension to other processing applications. In particular, the present invention is envisioned for use with the processing of pickles, peppers, olives, and other foods that are treated in a brine solution.

The above description is that of a preferred embodiment of the invention. Various alterations and changes can be made without departing from the spirit and broader aspects of the invention set forth in the appended claims, which are to be interpreted in accordance with the principles of patent law, including the Doctrine of Equivalents.

The embodiments of the invention in which an exclusive property or privilege is claimed are defined as follows:

1. A method for processing food, comprising:
   brining the food in a brine solution;
   leaching the food, said leaching step producing a discharge;
   separating the discharge from said leaching step into a salt solution and a residual solution; and
   returning the residual solution to said leaching step.

2. The method of claim 1, wherein said separating step comprises desalting electrodialysis.

3. The method of claim 1, wherein the salt solution produced in said separating step is reused in said brining step.

4. The method of claim 1, further comprising finishing the food.

5. The method of claim 3, further comprising concentrating the salt solution prior to reuse in said brining step.

6. The method of claim 5, further comprising:
   sorting the food; and
   sizing the food.

7. The method of claim 6, wherein said sorting and sizing steps produce a liquid waste, the liquid waste from said sorting and said sizing steps being combined with the discharge from said leaching step prior to said separating step.

8. A method for processing food, comprising:
   soaking the food in a brine solution;
   flushing the food with water producing a discharge stream;
   separating the discharge stream into a salt solution and a sugar solution;
   returning the salt solution to said soaking step;
   returning the sugar solution to said flushing step; and
   finishing the food to raise its sugar content to a desired level.

9. The method of claim 8, wherein said separating step comprises desalting electrodialysis.

10. The method of claim 8, further comprising:
    sorting the food;
    sizing the food; and
    pitting the food.

11. The method of claim 10, wherein any waste from said pitting step is combined with the discharge stream prior to said separating step.

12. The method of claim 8, further comprising concentrating the salt solution prior to said salt solution returning step.

13. A method for processing cherries, comprising:
    brining the cherries in a brine solution containing sulphur dioxide;
    leaching the cherries with water to reduce the concentration of sulphur dioxide in the cherries; said leaching step producing a discharge;
    separating the discharge from said leaching step into a salt solution and a sugar solution;
    returning the sugar solution to said leaching step; and
    finishing the cherries to give them the desired color and sugar content.

14. The method of claim 13, said separating step comprises desalting electrodialysis.

15. The method of claim 13, further comprising returning the salt solution to said brining step.

16. The method of claim 15, further comprising concentrating the salt solution prior to its return to said brining step.

17. The method of claim 13, further comprising:
    sorting the cherries;
    sizing the cherries;
    pitting the cherries; and
    combining any waste from said pitting step with the discharge prior to said separating step.

* * * * *